R. B. DISBROW.
VALVE MECHANISM FOR MILKING APPARATUS.
APPLICATION FILED OCT. 6, 1917.
1,308,052. Patented July 1, 1919.
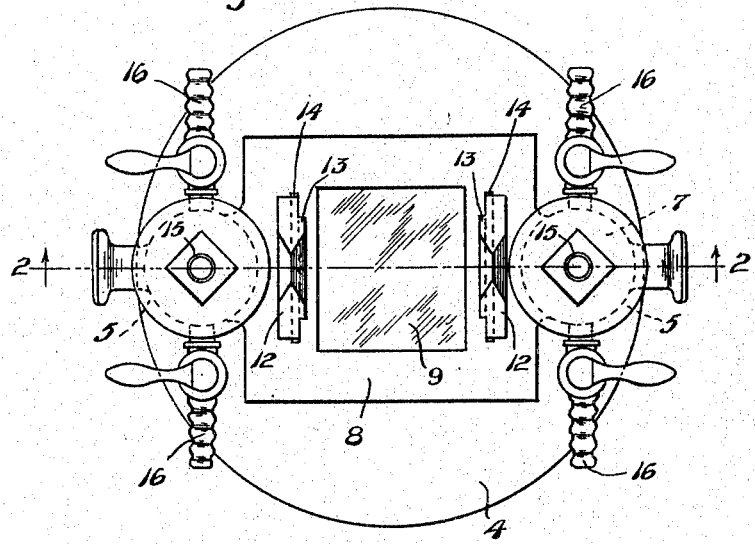
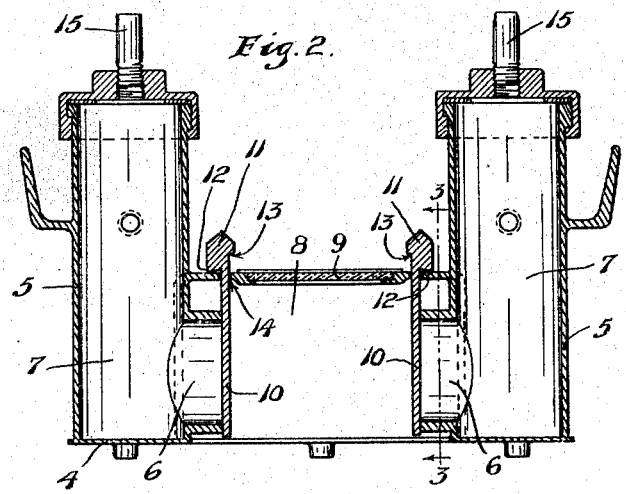
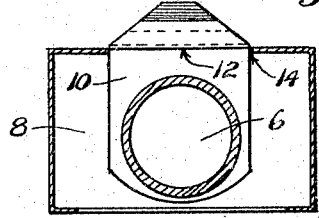
WITNESSES.
H. L. Opsahl.
E. C. Wells
INVENTOR
R. B. DISBROW.
BY HIS ATTORNEYS

UNITED STATES PATENT OFFICE.

REUBEN B. DISBROW, OF ST. PAUL, MINNESOTA.

VALVE MECHANISM FOR MILKING APPARATUS.

1,308,052.  Specification of Letters Patent.  Patented July 1, 1919.

Application filed October 6, 1917. Serial No. 195,162.

*To all whom it may concern:*

Be it known that I, REUBEN B. DISBROW, a citizen of the United States, residing at St. Paul, in the county of Ramsey and State of Minnesota, have invented certain new and useful Improvements in Valve Mechanism for Milking Apparatus; and I do hereby declare the following to be a full, clear, and exact description of the invention, such as will enable others skilled in the art to which it appertains to make and use the same.

My present invention relates to milking apparatus, and has for its object to provide an extremely simple, efficient and sanitary valve device for the vacuum chamber or milk delivery compartment of the milking apparatus.

The milking apparatus, in so far as it is shown in the accompanying drawings, is of a type disclosed in my pending application 169,914, filed May 21st, 1917.

Referring to the drawings, wherein like characters indicate like parts throughout the several views:

Figure 1 is a plan view of what may be herein treated as the milking head, meaning thereby, that portion of the milking apparatus which is supported by the can cover, and which contains the vacuum chamber through which the milk is delivered into the can.

Fig. 2 is a vertical section on the line 2—2 of Fig. 1; and

Fig. 3 is a transverse section on the line 3—3 of Fig. 2.

In this type of milking apparatus, the vacuum chamber and valves coöperating therewith are applied directly on the cover, and the teat-cups are connected to the so-called vacuum chamber by flexible tubes. Partial vacuum is produced in the so-called vacuum chamber, by a pulsating device, preferably consisting of coöperating cylinders and pistons that alternatively produce partial vacuum and air pressure in the respective so-called vacuum chambers.

The can cover 4 affords the base for the upright vacuum chamber 5, the walls of which are shown as cast integral therewith. These vacuum chambers 7 at their lower portions have lateral sleeve-like extensions 6 that open into an intermediate milk receiving chamber 8, the bottom of which is open so that the milk will be discharged directly therefrom into the can upon which the cover 4 is placed. As shown, the chamber 8 has a transparent plate or glass pane 9 at its top, but this feature constitutes no part of the present invention.

Normally the delivery ends of the sleeves 6 are closed by check valves of the "flapper" type, and which valves constitute the all important feature of the present invention. Each such valve is made in the form of a slightly flexible rubber plate 10, having at its upper edge a head 11. This head 11 is formed with an undercut laterally offset edge, or shoulder 12, which affords a fulcrum support for the valve when applied. Preferably, also, on its opposite face the valve 10 is formed with a second and less important shoulder 13 which stands materially above the shoulder 12. The top plate of the chamber 8 is formed with slots 14, through which the valves 10 may be freely dropped or inserted into working positions, as shown in the drawings. Here it is important to note (see particularly Fig. 2), that when these valves are in working position they are supported on their fulcrum edges 12, and which fulcrum edges are offset from the valve acting faces, so that the said valves under the action of gravity will be normally held against the edges of the coöperating sleeves 6.

Obviously, when partial vacuum is produced in one of the chambers 5, the valve 10, which is already seated, will simply be more tightly seated against the sleeve 6, but when air pressure is produced in said chamber 5, the said valve 10 will freely swing into open position, so as to permit a delivery of the milk from the vacuum chamber into the so-called milk delivery chamber.

A valve of the above character, while efficient, does not require any fine construction in the valve or seat, and, moreover, may be easily removed, washed, sterilized and replaced. The shoulder 13, which is always above the top of the supporting plate, gives a good grip to the fingers in lifting the valve from position.

The numeral 15 indicates tubes leading from the upper portions of the vacuum chamber 5, and which, in practice, will be connected to the pulsator, or means for producing variable pressure.

The numeral 16 indicates valve equipped tubes leading to the sides of the vacuum chambers 5, and which, in practice, are connected to the teat-cups.

What I claim is:

1. A casing having a port with an approximately vertical face, and a plate above said port, said plate having a vertical slot in approximate alinement with the face of said port, and a valve in the form of a flat plate insertible through said slot, and having an offset ledge serving as a fulcrum therefor, and supporting the same gravity seated against the face of said port, the said valve being readily removable.

2. A casing having a port with an approximately vertical face, and a plate above said port, said plate having a vertical slot in approximate alinement with the face of said port, and a valve in the form of a flat plate insertible through said slot, and having an offset ledge serving as a fulcrum therefor, and supporting the same gravity seated against the face of said port, the said valve being readily removable and being of a slightly flexible material and having a head located above said splate and provided with an offset portion adapting it to be readily engaged by the fingers.

In testimony whereof I affix my signature in presence of two witnesses.

REUBEN B. DISBROW.

Witnesses:
  CLARA DEMAREST,
  BERNICE G. BAUMANN.

Copies of this patent may be obtained for five cents each, by addressing the "Commissioner of Patents, Washington, D. C."